Dec. 2, 1969  V. P. BROUSSARD  3,481,121
SUGAR CANE HARVESTERS
Filed Dec. 19, 1966  2 Sheets-Sheet 1
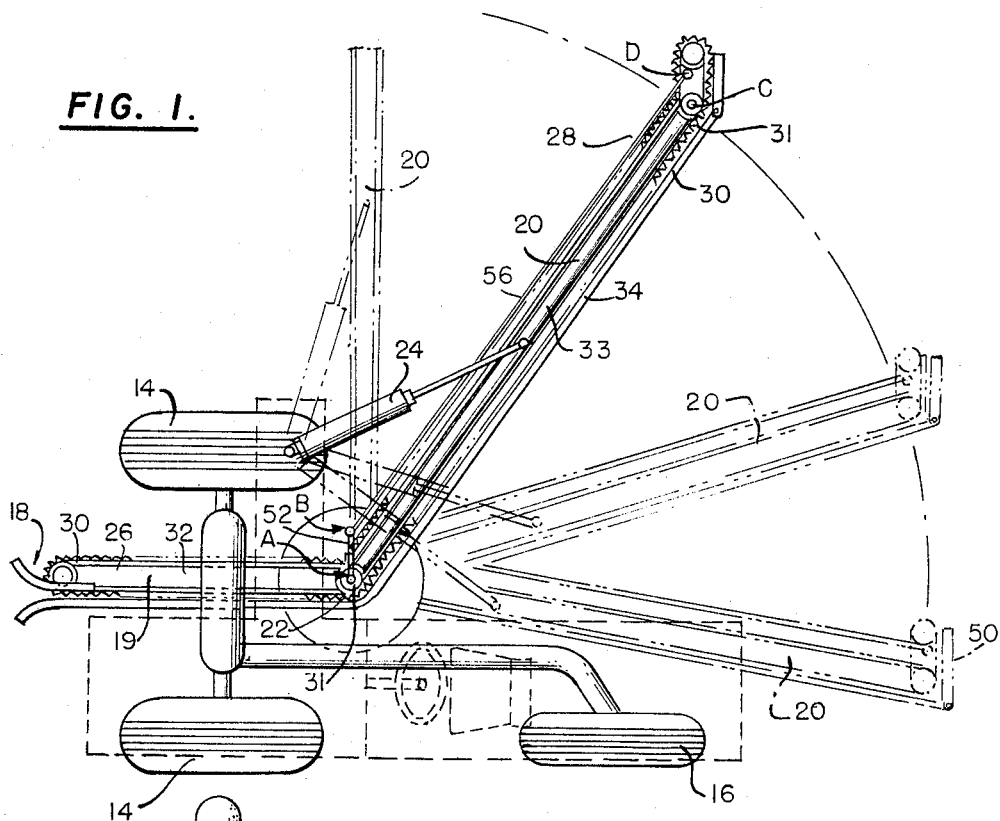
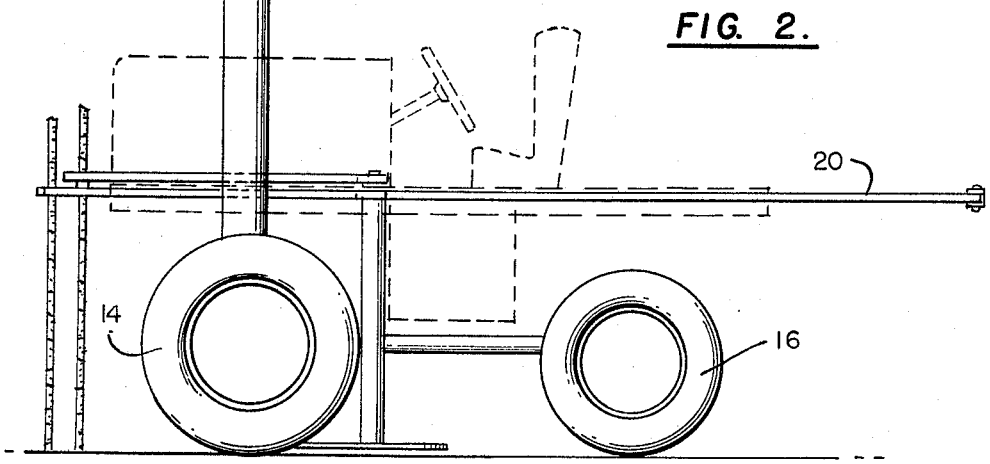
INVENTOR
Vernon P. Broussard
BY Lake & Pugh ATTORNEYS Dec. 2, 1969  V. P. BROUSSARD  3,481,121
SUGAR CANE HARVESTERS
Filed Dec. 19, 1966  2 Sheets-Sheet 2
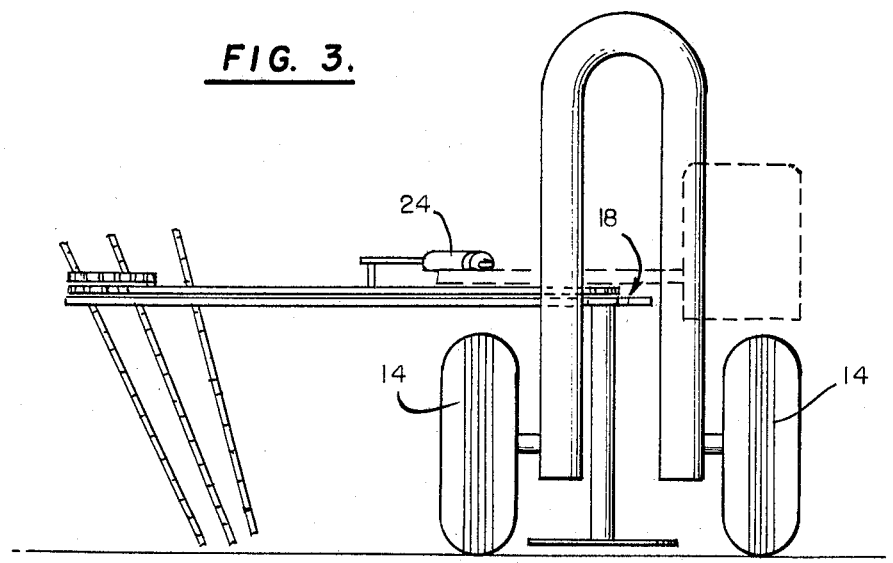
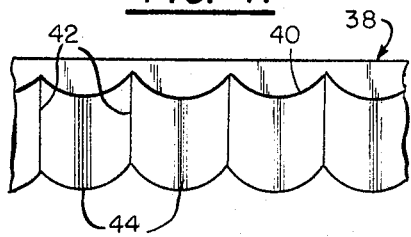
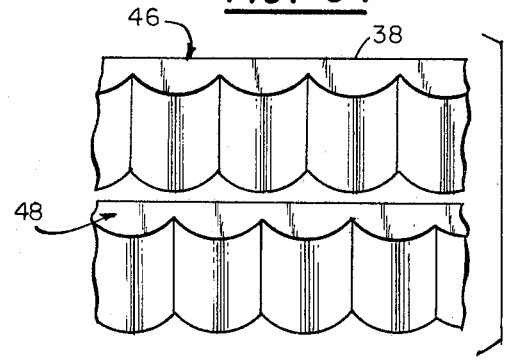
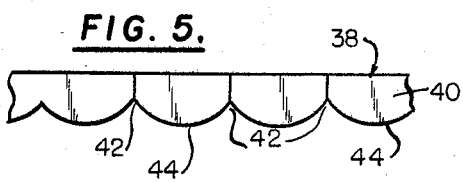
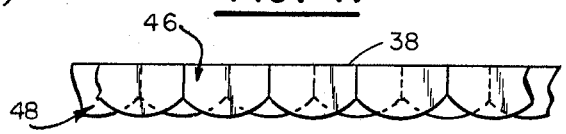
INVENTOR
Vernon P. Broussard
BY Lake & Pugh ATTORNEYS United States Patent Office 3,481,121
Patented Dec. 2, 1969

3,481,121
SUGAR CANE HARVESTERS
Vernon P. Broussard, P.O. Box 227,
St. Martinsville, La. 70582
Filed Dec. 19, 1966, Ser. No. 602,638
Int. Cl. A01d 45/10; B65g 37/00
U.S. Cl. 56—15                            6 Claims

ABSTRACT OF THE DISCLOSURE

A three wheeled power train having two fluid drive wheels and a rear steerable wheel in fore and aft line with one of the front wheels, a piling arm pivotally mounted to swing in a horizontal plane in the open space between the rear wheel and the diagonal front wheel, said piling arm comprising a parallelogram of forces adjustable by one arm to position the free end of said piling arm normal to cane rows at any position of its horizontal swing, and belts having flexible projections operatively mounted on said piling arm and in cooperation with a pressure bar for carrying cut cane to the free end of said piling arm for piling.

---

The invention relates generally to a sugar can harvesting and piling machine, and more particularly to an improved combination of a tricycle tractor and a piling arm for more efficient and economical cutting and piling of sugar cane in windrows for collection.

An object of the invention is to provide a tractor wheel arrangement that permits maximum movement of the piling arm and maximum stability in muddy fields.

Another object of the invention is to provide a piling arm that piles cane normal to the sugar cane rows with the piling arm at any operating angle to the rows.

Another object of the invention is to provide improved conveyors that will retain the cut cane before and after clumps in the conveyor from the cutting to the piling.

Other objects and a fuller understanding of the invention may be had by referring to the following desciption and claims taken in conjunction with the accompanying drawings, in which:

FIGURE 1 is a diagrammatic plan view of the invention,
FIGURE 2 is a side view of FIGURE 1,
FIGURE 3 is a front view of FIGURE 1,
FIGURE 4 is a side view of a section of one species of endless belt for the cane conveyors,
FIGURE 5 is a plan view of FIGURE 4,
FIGURE 6 is a view similar to FIGURE 4 but of another species of endless belt, and
FIGURE 7 is a plan view of FIGURE 6.

Referring to FIGURES 1–3, the invention 10 comprises a tricycle tractor 12 having two front driving wheels 14 and a rear smaller supporting wheel 16 positioned behind one of the front wheels 14. A conventional combination 18 of cane guide, cutter, topper and conveyor having a stationary boom 19 is mounted between the front wheels 14 and extends fore and aft thereof. A piling arm 20 is pivotally mounted on the tractor behind and in congruent cooperation with the conventional combination 18, and is adapted to swing in a horizontal plane around its pivotal mounting 22 in the open space between the rear supporting wheel 16 and the front wheel 14 diagonally opposite therefrom. A hydraulic cylinder 24 is operationally mounted on the tractor adjacent said open space for moving the piling arm 20 to any horizontally angular position therein from normal to the tractor to beyond the longitudinal center-line of the tractor extended aft. In extending the swing of the piling arm by omitting an interfering rear wheel, the arm can be made any convenient ratio of angular swing to length to pile six rows of cane on one row.

Conveyors 26 and 28 for carrying the cane between cutting and piling sites are mounted in said conventional combination 18 and on the piling arm 20 respectively. The conveyors can be of the well known type comprising respectively an endless sticker chain 30, as it is known in the art, mounted to travel around and between rollers 31 mounted for rotation near the opposite ends of their respective booms 32 and 33. A pressure bar 34 is mounted on the respective booms to extend along and be biased against the loaded side of the sticker chain which has a plurality of equally spaced and fixed projections for carrying the cane therebetween in cooperation with the pressure bar. The carrying space of this combination is limited by the fixed projections so that when clumps of cane are encountered and cut the pressure bar is displaced against its bias from the sticker chain to allow cut cane on the immediate each side of a clump to fall between the pressure bar and the sticker chain and from the conveyor.

Instead of a sticker chain another species, as shown in FIGURES 4 and 5 comprises a basic belt 38 and a second belt 40 spacedly fastened in a plurality of gathers 42 to the outer surface of the basic belt to form flexible projections 44 and expandable spaces therebetween for the accommodation of cane clumps without increasing the distance between the cooperating space bar and the endless belt.

In a third specie of endless belt, as shown in FIGURES 6 and 7, an upper belt 46 and a lower belt 48 are fixed in gathers to the basic belt 38 so that where one belt is gathered inwardly the other belt extends outwardly whereby the distance between projecting parts of gathers is halved with little decrease in the maximum carrying capacity of the flexible pockets therebetween.

The piling arm 20 has a conventional flexible free end 50 that is controlled to pile cane normal to any piling row regardless of the angular position of the piling arm. A unique feature of the invention is the automatic control of its flexible end 50. The automatic control is effected by the linkage parallelogram of forces ABCD. A rod 52 representing link AB is angularly adjustable then fixed by an end to the tractor at the pivotal mounting 22. The rod 52 is half of the length of the flexible end 50, the half representing an opposite link CD. A rod 56 represents the third link BD and is pivotably fastened by its respective ends to the free end of rod 52 and the center of the flexible end 50 and is the same length as the boom 33 which is the fourth link AC. In operation the rod 52 is oriented with respect to the tractor 12 in harvesting position so that the flexible end 50 is normal to any piling row and then fixed. When the piling arm is swung to any row the flexible end 50 will be swung to a position normal to that row by the force parallelogram.

Although the invention has been described with a certain degree of particularity, it is understood that the present disclosure has been made only by way of example and that numerous changes in details of construction and the combination and arrangement of parts may be resorted to without departing.

What is claimed is:
1. An improved cane harvesting and piling machine comprising in combination: a tricycle tractor having two front driving wheels for pulling said machine, and a rear supporting wheel mounted directly behind one of said front wheels; means for harvesting said cane mounted between said front wheels and extending forward and aft thereof; a piling arm pivoted by an end on said tricycle tractor aft of said front wheel and congruent with said harvesting means, said piling arm being adapted to pivot between said rear wheel and the diagonally opposite front wheel; and power means for controllably pivoting said piling arm.

2. An improved cane harvesting and piling machine as described in claim 1 characterized in that said piling arm comprises: a straight major part and an angularly adaptable discharge end; automatic means for angularly adjusting said discharge end to remain normal to the direction of tractor travel for any angle said piling arm is pivoted; and means for carrying harvested cane from said harvesting means to said piling arm discharge end and there releasing it.

3. A piling arm as described in claim 2 wherein said automatic means for angularly adjusting the discharge end comprises: an angularly adjustable first rod fixed by an end to said tricycle tractor on the axis of said piling arm pivot, said first rod being half as long as said discharge end; a second rod pivoted by an end to the free end of said first rod and by its opposite end to the midpoint of said discharge end, whereby said rods form with said straight major part and said discharge end a parallelogram of forces that swings said piling arm discharge end normal to any row when said first rod is fixed with respect to said tractor for said discharge end to be normal to a row.

4. A piling arm as described in claim 2 wherein said means for carrying harvested cane comprises: and endless belt for rotating between and around spaced apart rollers on said piling arm; a second belt spacedly attached in gathers to the outer surface of said basic belt to define flexible open pockets alternating with closed flexible projections for engaging stalks of cut cane therebetween; a pressure bar pivotally attached by an end to said piling arm and biased against said flexible pockets and projections for closing said open pockets and retaining said cut cane between said belt and said pressure bar, whereby said flexible pockets engage clumps of cut cane without unduly displacing said pressure bar to drop cane on either side of said clumps.

5. Means for carrying harvested cane as described in claim 4 wherein a third belt is pacedly attached in gathers to the outer surface of said basic belt, parallel to said second belt, but with the alternately occurring open pockets and closed projections defined by the gathers of said third belt arranged to oppose the closed projections and open pockets of said second belt.

6. An improved cane harvesting and piling machine comprising in combination: a tricycle tractor having two front driving wheels for pulling said machine, and a rear supporting wheel mounted directly behind one of said front wheels; means for harvesting said cane mounted between said front wheels and extending forward and aft thereof; a piling arm pivotally mounted on said tricycle tractor aft of said front wheels and adapted to angularly pivot in the angle defined by said rear wheel and the diagonally opposite front wheel for piling cane within the defined angle.

References Cited
UNITED STATES PATENTS

| | | | |
|---|---|---|---|
| 1,741,602 | 12/1929 | Athey | 56—17 |
| 2,427,313 | 9/1947 | Thomson | 56—15 |
| 2,669,829 | 2/1954 | Pugh | 56—192 |
| 2,699,030 | 1/1955 | Adamson | 56—17 XR |
| 3,095,679 | 7/1963 | Pugh et al. | 56—15 |

ANTONIO F. GUIDA, Primary Examiner

U.S. Cl. X.R.

198—88